United States Patent [19]
Gross et al.

[11] Patent Number: 5,135,122
[45] Date of Patent: Aug. 4, 1992

[54] METHOD AND APPARATUS FOR DEHYDRATING FRUIT

[75] Inventors: David R. Gross, Orrville; Robert J. Valenzky, Akron, both of Ohio

[73] Assignee: The J. M. Smucker Company, Orrville, Ohio

[21] Appl. No.: 657,938

[22] Filed: Feb. 21, 1991

Related U.S. Application Data

[63] Continuation of Ser. No. 293,066, Jan. 3, 1989, abandoned.

[51] Int. Cl.$^5$ .............................................. H05B 6/78
[52] U.S. Cl. ...................... 219/10.55 A; 219/10.55 B; 34/1 R
[58] Field of Search ................ 219/10.55 F, 10.55 A, 219/10.55 B, 10.55 R; 34/1

[56] References Cited
U.S. PATENT DOCUMENTS

| | | | |
|---|---|---|---|
| 4,477,706 | 10/1984 | Mittelsteadt | 219/10.55 B |
| 4,542,268 | 9/1985 | Jarvis et al. | 219/10.55 B |
| 4,640,020 | 2/1987 | Wear et al. | 34/1 |
| 4,675,507 | 6/1987 | Akiyoshi et al. | 219/10.55 B |
| 4,687,895 | 8/1987 | Chitre et al. | 219/10.55 A |
| 4,746,968 | 5/1988 | Wear et al. | 219/10.55 |

Primary Examiner—Philip H. Leung
Attorney, Agent, or Firm—Body, Vickers & Daniels

[57] ABSTRACT

A vessel that encloses a chamber for drying a product containing moisture is provided with microwave radiation generating devices to elevate the temperature of the moisture in the product so that moisture escapes from the product. The vessel is also provided with a thermal radiator for directing infrared radiation toward the product to elevate the temperature of the product so as to contribute to the escape of moisture therefrom. The thermal radiator includes a plurality of metal heating plates which coplanar and spaced apart to provide openings therebetween to permit microwave radiation to pass to the product.

13 Claims, 11 Drawing Sheets

METHOD AND APPARATUS FOR DEHYDRATING FRUIT

This is a continuation of Ser. No. 293,066, filed Jan. 3, 1989, now abandoned.

This invention relates to the art of dehydration, and in particular, to a new and improved method and apparatus for the dehydration of fruit, vegetables and other food products.

The invention is particularly applicable to the dehydration of fruits in particle form which must be dehydrated to a low moisture content of less than 5%, and preferably less than around 3%, moisture while retaining a natural flavor, puffed appearance and crisp texture. Such fruits may include apples, peaches, pears, strawberries, bananas and other like fruit or vegetables and will be described with reference thereto, although it will be appreciated that the invention has other broader applications that may be used for the dehydration to low moisture content of other moisture containing food products. The moisture content determines the physical characteristics of the food product. This invention can reduce the moisture to a variety of controlled lower values to make products between crisp and pliable.

INCORPORATION BY REFERENCE

Earlier patents Wear et al U.S. Pat. No. 4,640,020 and Wear et al U.S. Pat. No. 4,746,968 relate to work done by assignee. These patents are incorporated by reference herein so that all the details of various structure employed in constructing the present invention need not be repeated. The various structures disclosed in these patents can be used in practicing the present invention. Combinations of equipment and components shown therefrom are intended for use in any of the disclosed embodiments of this invention.

BACKGROUND

The dehydration of whole fruit or fruit pieces is a well known method for preserving the fruit for ultimate manufacturing, processing or consumption. At the dehydrated moisture levels, enzymatic and chemical reactions are minimal. Therefore, dehydrated fruit has marked quality stability. For ultimate manufacturing or further processing, the increased bulk density additionally reduces shipping, handling and packaging costs. The dehydrated fruit can be consumed directly or combined with other consumable ingredients such as cereals, fruit mixtures, food mixes or the like. The dehydrated fruit can be stored at room temperature for extended periods. When properly processed, the dehydrated fruits should retain quality attributes, i.e. color, flavor and texture. When they are reconstituted, the fruit should be of a quality approaching that of fresh fruits of the same types.

Dehydrated fruit is contrasted from dried fruits which normally have a moisture content of between 10-20%. As used herein, dehydrated fruits are those which are dried to a moisture content of 5% of lower. The moisture content of fruits and vegetables determine, to a large extent, their physical qualities of crispness and/or flexibility.

Dried or concentrated fruits of intermediate moisture content, such as raisins and apricots, are produced in a number of ways. Generally, the drying is accomplished at atmospheric pressure using a combination of convection and conduction heating. To achieve the requisite drying, high fruit temperatures are required to remove the fruit moisture. These elevate temperatures can cause irreversible changes in the fruit color and flavor, oftentimes producing characteristics commonly called "dried fruit taste." Such drying may require additions of sulfur dioxide and other preservatives to prevent excessive color changes and/or deterioration during drying and storage.

Even more difficult is the complete dehydration of fruit. Such dehydration has conventionally been approached on the basis of using even higher temperatures or heating under vacuum to remove the remaining 15-20% of the moisture from the dried fruit. Most commonly, the fruit is heated by conduction in direct contact with the heated surface, such as a drum. This requires extremely long heating cycles ranging between 6-24 hours to effect the necessary moisture removal. This process removes the characteristic taste of the fruit by driving the organic fragrance compounds from the fruit with the water vapor. Such a process is not desired and is not particularly amenable to continuous operations. Furthermore, the product may be changed structurally, being shrunken in appearance, hard in texture and lack fresh fruit flavor. Freeze drying under vacuum has been used to provide the drying with improved properties. However, this requires high vacuum with low evaporative rates resulting in a slow process with prohibitive capital and operating costs for most foodstuffs. This slow processing reduces the taste of the fruit.

The limitations of surface heating and evaporation may be explained by understanding the accepted model for such a process. For given processing conditions, there is an initial constant rate period wherein evaporation proceeds at a constant rate until the fruit surface becomes unsaturated. This moisture removal is by capillary action or diffusion and is primarily effected through the heating of the external surface of the fruit. For further moisture removal, the surface heat energy must be conducted inwardly to the cool interior of the fruit core to cause migration of the moisture across a negative moisture gradient from high moisture density internal areas to the partially dehydrated surface. This results in a falling migration rate stage where the evaporative rate decreases steadily. For thorough dehydration, a third rate period or stage is experienced wherein moisture has to be evaporated from the fruit. This rate is even slower and requires a product temperature well above those which would be expected for evaporation at the prevailing drying vessel pressure.

It has been proposed to use microwave or radiation under vacuum conditions for the processing of various foodstuffs and products. As disclosed in U.S. Pat. Nos. 4,045,639, 4,015,341 and 4,229,886, microwave radiation may be used for dehydrating various moisture containing materials in a evacuated chamber. U.S. Pat. Nos. 4,096,283 and 4,341,803 disclose that a partially dried food product can be batch dehydrated at an intermediate processing using microwave energy. Use of microwave in zones for fruit drying is disclosed in U.S. Pat. No. 4,640,020 and is a relevant showing of microwave as it was developed during the project resulting in the present invention.

However, microwave energy alone does not provide a totally effective and acceptable method for dehydrating food, particularly fruit and fruit pieces, as disclosed in the introductory portion of U.S. Pat. No. 4,746,968. While microwave radiation, as shown in U.S. Pat. No.

4,640,020, is effective to internally raise the temperature of the fruit piece or particle and promote outward migration of the moisture, the outer surface, which may be skin in a whole fruit such as a grape, is not effectively heated. The evaporation rate is effectively limited by the ambient temperature and vacuum conditions; therefore, the rate of microwave energy which can be effectively employed is limited. Unless the migration rate effected by the microwave heating of the interior of the fruit piece is below the evaporative rate determined by the ambient temperature of the vacuum chamber, the moisture can recondense on and be absorbed back into the fruit piece. This can cause the subcooling of the surface further reducing the effectiveness of the microwave heating of the interior of the fruit.

BRIEF SUMMARY OF THE INVENTION

By employing microwave heating, the product being dried does not have a uniform temperature gradient from the interior of the particle of the food product to the outside. Consequently, non-uniform drying can occur and a substantial resident time is required. This can substantially reduce the taste due to loss of the aromatic and/or organic fragrance creating compounds forming the familiar taste and/or smell of the various fruits. Consequently, the use of microwave for heating food products is not conductive to maintaining the desired appearance, fragrance and taste of fruit. The same is quite true of convection and radiant heating which heats from the outside of the fruit or food product. This again causes a temperature gradient and requires a substantial residence time that substantially reduces the fragrance and taste characteristics of the food product and produces the somewhat standard dried fruit taste.

Consequently, there has been a substantial demand and need for a high speed, continuous drying mechanism and method which can dry a variety of fruits and/or vegetables to a desired low moisture content without substantial decline in the characteristic flavor and aroma of the fruit.

The present invention overcomes the disadvantages discussed above and other disadvantages associated with high temperature conductive and convective dehydration and high energy microwave heating. The invention employs radiant energy in a manner which produces a surprisingly reduced drying cycle while yielding fruit pieces having a crunchy texture and a fresh fruit taste. This invention allows a controlled low moisture level for the fruit or vegetable while maintaining taste. A higher moisture content can be obtained to produce a more flaccid piece of fruit. Vegetables can have reduced moisture while retaining a firm structure for use in commercial soup processing.

More particularly, the present invention uses infrared energy under vacuum for maintaining an optimum evaporative rate. In this manner, moisture leaves the product without subcooling or reabsorption back into the fruit. The infrared energy may be supplemented with microwave energy to effect an optimum moisture migration rate. The microwave heats from the inside with a given temperature gradient while radiation heats from the outside with a somewhat inverted temperature gradient. By combining these two heating concepts at selected levels, the two moisture gradients are combined to result in uniform heat distribution and an equilibrium of moisture migration and evaporation. This synergistic process results in substantially shorter drying cycles than possibly from either infrared energy or microwave energy alone, permits the more efficient use of heat energy to effect dehydration and results in better product quality control through avoidance of the burn spots or wet spots. The new process is effective for continuous processing and is readily controlled, achieving quality control of varying fruits sizes and shapes. The process requires lower capital investments in comparison with processing using microwave energy as the sole evaporative system. The process is performed in a vacuum in a continuous operation mode; consequently, the vacuum chamber can be economically reduced in length when using the present invention.

In the preferred embodiment of the invention, the fruit is appropriately prepared by washing, coring, destemming and/or peeling sound, whole fruits such as apples, peaches, pears, strawberries, bananas and the like. The fruit may then be cut into desired slices or pieces. The end use of the dehydrated fruit determines the size and shape of the piece. Where such fruits are subject to discoloration due to oxidation, suitable antioxidants such as ascorbic acid may be used before drying.

After initial processing, the fruit pieces may be dehydrated directly or be osmotically concentrated in a conventional manner with high solids, sweetner syrups such as sucrose, invert, dextrose, high fructose corn syrups, corn syrups or mixtures thereof, or may be treated with concentrated fruit juices to provide a high solids content by removing a portion of the initial moisture. The pieces are pumped in a carrier liquid such as water, syrup or fruit juice into an evacuated drying chamber using a suitable positive pump. However, this does not preclude extruding or depositing a fabricated piece directly on the belt without a carrier liquid. The food product can be a liquid itself. The carrier mixture when used for fruit pieces is maintained below the boiling point at the chamber vacuum. The chamber or vessel is maintained at a vacuum of around 15-100 Torr. The carrier liquid is separated from the fruit pieces and conveyed outside the chamber. The fruit pieces are then evenly and uniformly deposited onto an endless conveyor belt for feeding through the longitudinal length of the vessel. The vessel is divided into various treating zones by suitable radiant and microwave shielding screens. These screens also are impervious to microwave energy and may include interconnecting tunnels having an opening matching one run of the conveyor with a narrow width to prevent microwave transmission between heating zones.

If desired, the pieces of fruit can be separated from any carrier liquid outside the vacuum chamber or vessel and, then, introduced into the feed zone of the vacuum chamber air lock valves or a rotary air tight valve. Fluids, such as puree or concentrated juice can be dried by the invention by applying them in a liquid sheet onto the moving conveyor for drying. The puree or juice is a "food product" as used in this disclosure.

In the first drying or heating zone, the fruit is subjected to simultaneous infrared and microwave radiation. Most of the heating and moisture extraction occurs in this first zone so that the more rapidly diffused water vapor can be removed in large quantities while trapping the organic fragrance compounds which migrate or diffuse at a lower rate. The microwave energy is set at a watt density level sufficient to produce high internal heating and a steep moisture gradient toward the surface. The infrared energy is controlled by a suitable optical sensor to maintain a product surface temperature at a value providing an evaporation rate balanced with the high migration rate of the moisture caused by the microwave energy heating in the first zone. The surface temperature, however, does not exceed a temperature where browning or darkening of the piece surface occurs. The minimum temperature is within a range in which the fruit piece is in the plastic condition where the cell walls lack rigidity but are not ruptured, preferably somewhere between 35° C. and 95° C. This range has been found to enhance the migration from the interior to the outer surface in the first heating zone.

The temperature of the radiant heaters can be set manually together with the microwave generators of the first zone. This is true of later heating zones also. Preferably, when the radiant heaters are resistance heated plates with low temperature response time, the plate wattage is set and the microwave is adjusted. When the fast response time quartz heating rods are used, the radiant heaters can be pulsed to control surface temperature. Then the microwave generators can be independently set or also modulated. Feedback control of the drying cycle at least in the first and last heating zones is employed in the preferred embodiment of the invention. The heating is adjusted by measurement of the surface temperature at the end of a heating zone and/or by measuring the moisture content at the end of the total drying cycle. These feedback systems can control the conveyor belt speed and/or individually control the microwave generators or the infrared heating units in the different zones. In one embodiment, the output moisture content is determined by a radio frequency moisture sensor to control the microwave generator in the last heating zone. This assures accurate drying without changing the total process in the earlier zones using set combinations of microwave energy and radiant heating.

Infrared energy can be controlled by intermittent on/off operation and/or by continuous electric power level adjustment to the radiant heating elements. Solid metal plate means or resistance rods form a heat sink that does not change temperature rapidly. Consequently, they are not amenable to intermittent operation; however, by using quartz elements or rods, which include a tungsten heating element surrounded by a quartz sheath, the radiant heat element extending along the conveyor can be turned on and off to control temperature of the radiator real time basis. Radiant heating is determined by the temperature and spacing of the radiators.

Microwave energy from the individual generators in each heating zone is controlled electrically. With the belt speed being kept constant, the infrared heaters can be controlled by optical sensors which determine temperature of the product at several points along the conveyor belt. When the dryer is properly tuned there is sufficient microwave energy applied to "pump" the moisture from the interior of the product layer as fast as the infrared radiation evaporates it. Consequently, in this control scheme, the radiant heaters are modulated by the desired sensed temperature while the microwave heating stays relatively constant.

It has been found that optimum quality of the dried product and efficient energy usage is obtained with the microwave energy range from 20% of the total heat energy for purees and juices to 40% of the total heat energy for fruit pieces.

Almost all natural products, such as fruits and vegetables, have drying curve consisting of an initial constant rate period where drying, i.e. reduction of moisture in percentage versus time is almost a straight line function. At the conclusion of this initial constant drying rate period, which can result in the product being between 5 to 15% moisture, the drying rate commences into a period when the rate is controlled by mass transfer coefficients. Water is removed at an ever decreasing rate. Thus, heat control to the product must factor in this nonlinear function of temperature and moisture migration. A mapping in the memory of a microprocessor can be provided to convert temperature readings into energy levels in the initial drying stage. Then the microprocessor can employ moisture to control the modulated amount of heat energy in the later non-linear drying stage. There may be even a third drying stage for fruit pieces, especially where capillary transfer becomes a limiting factor. By proper proportioning of the levels of microwave energy and radiant heating in the first heating zone and controlling the magnitude of the two heating concepts, the constant rate stage found when the fruit enters the first heating zone can be completed in 33% of the total drying cycle time. Thus, the high heating in the first zone brings the fruit to the non-linear stage. Completion of dehydration in the final stages of the process requires minor input of energy, usually only enough to balance the loss of heat by radiation from the product to the sides of the vacuum vessel. All of these factors can be controlled by the temperature and moisture sensing and feedback controls for radiant heaters and for the microwave generators.

At the conclusion of the drying cycle, the fruit has a slightly puffed appearance under vacuum. Inasmuch as the fruit pieces are in the plastic stage, they must be cooled before being subjected to atmospheric pressure in order to avoid cell wall collapse. Accordingly, the fruit pieces are fed by screw conveyors at the discharge end of the conveyor path and to small evacuated chambers. When each chamber is full, it is isolated by a valve from the main vacuum cavity. Liquid nitrogen or carbon dioxide is then injected into the cooling chamber. This rapidly and uniformly cools the fruit. The liquid gas also serves to raise the cooling chamber pressure to atmospheric thereby breaking the vacuum and permitting discharge of the dehydrated fruit pieces for further processing or packaging. In the cooling chamber, additional flavoring essence may also be added to enhance the final flavor of the fruit.

The fruit dehydrated to a low moisture content in accordance with this inventive process is firm in texture and retain the original color and flavor of the fresh fruit to a much greater degree than a conventionally dehydrated fruit. Such fruit can be consumed directly or in mixture with other foods such as cereals, confections and batter mixes. Different textures can be obtained by drying to higher controlled moisture content.

Accordingly, a primary object of the present invention is the provision of an apparatus and process for making vacuum dried food having high quality levels of color, texture and flavor and a controlled low level moisture content.

Another object is the provision of a vacuum drying apparatus and process for food using infrared radiation to maintain an optimum surface temperature for moisture evaporation.

A further object is the provision of a method and apparatus for the dehydration of moisture containing products in a vacuum using a balanced combination of simultaneous radiant surface heating and microwave internal heating.

Still another object is the provision of a method of dehydration realizing the economic advantages of infrared radiant drying and the penetrating advantages of microwave energy.

Still a further object is the provision of a method and apparatus for the dehydration of fruit using microwave energy and infrared energy under vacuum so as to assure that the water vapor generated by microwave energy in the interior of the fruit is evaporated at the surface by the infrared energy.

Another object of the invention is the provision of an apparatus and method of drying a food product having a first stage wherein high microwave heating and the needed radiant evaporation heating drives the water from the food product rapidly at the high migration rate of water so the organic fragrance compounds, which migrate slower, are retained.

Yet another object is the provision of a method and apparatus for accelerating the diffusion and migration of water to the surface of an article to be dried by maintaining, under vacuum, a steep gradient of water concentration from the interior to the surface temperature for evaporation while the less migratable organic fragrance compounds can not migrate at the rapid rate of the water.

Yet a further object is the provision of a method and apparatus for attaining texture control in vacuum dehydrated fruit through controlled application of microwave energy and infrared radiation.

BRIEF DESCRIPTION OF THE DRAWINGS

The present invention will be readily understood in conjunction with the detailed description by reference to the following drawings illustrating a preferred embodiment in which.

DETAILED DESCRIPTION OF THE PREFERRED EMBODIMENT

Figure 3:
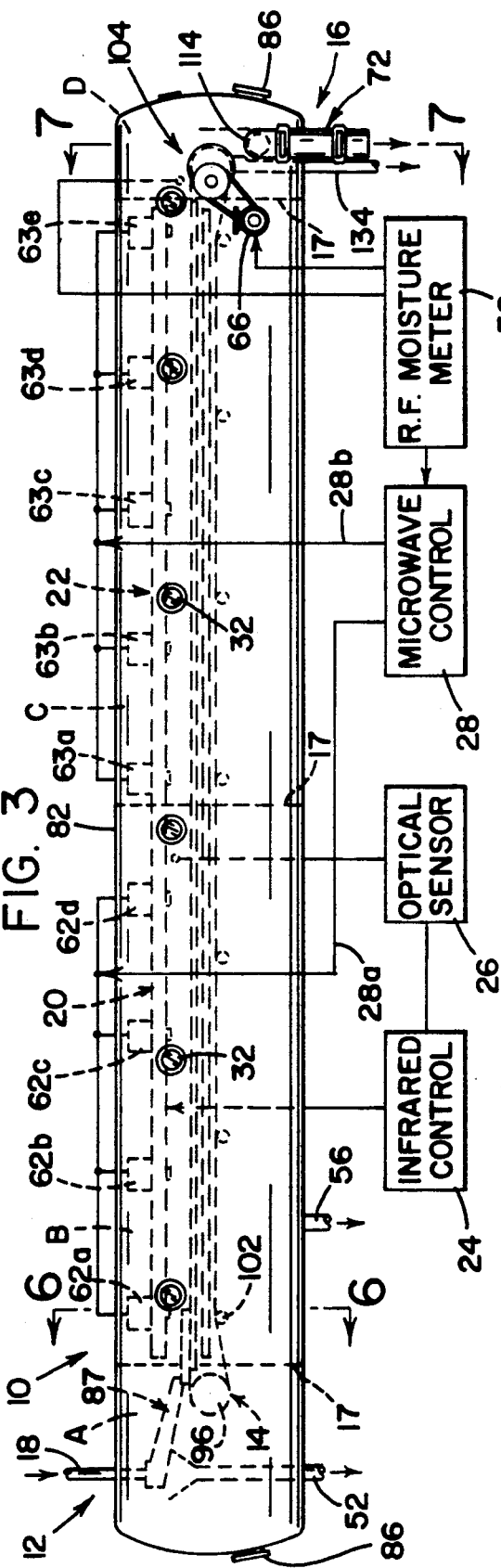
FIG. 3 is a side elevational view of the vacuum dryer schematically illustrating an arrangement of controls for the drying cycle in one embodiment of the invention as shown in FIG. 1.

Referring now to the drawings wherein the showings are for the purposes of illustrating preferred embodiments of the invention only and not for the purposes of limiting same, FIG. 3 in general shows a vacuum dryer 10 for dehydrating fruit such as without limitation, apples, peaches, pears, strawberries, bananas and other like fruit. The fruit, as hereinafter described in detail, enters the dryer 10 through inlet means 12 and is discharged onto a conveyor 14 for continuously moving the fruit along a longitudinal path from an inlet chamber or zone A, through a high energy drying chamber or zone B, a low energy drying chamber or zone C to a discharge chamber or zone D where the dehydrated fruit is removed for further processing or packaging through outlet means 16. The chambers are mutually separated by radiation shields 17.

It will hereinafter become apparent that the vacuum dryer can also be beneficially used for drying foods in general, and also from removing moisture from other products requiring an economical removal of moisture prior to subsequent processing.

Prior to the vacuum drying process, the fruit is prepared by appropriate washing, coring, destemming and/or peeling. The fruit may be then directly dried or cut into desired slices, dices or pieces. The end use of the dehydrated fruit will of course dictate the size of the piece. Further, inasmuch as certain fruit discolor rapidly due to oxidation, it may be desirable to add a suitable antioxidant, such as ascrobic acid, if considerable delay before drying is anticipated.

After this preliminary processing, the fruit pieces can be placed directly into the vacuum dryer, or they can be treated with a high solids sweetner syrup, such as sucrose, invert, dextrose, high fructose corn syrup, corn syrup or mixtures thereof. This effects osmotic concentration of the fruit in a well known manner. Alternatively, the fruit can be osmotically treated with concentrated fruit juices Prior to entering the dryer, the processed fruit is combined with a suitable carrier liquid such as water, syrup or fruit juice. The carrier mixture is pumped through vacuum interlocks not shown, to a vertical inlet pipe 18 of the inlet means 12 and into chamber or zone A. The temperature of the carrier is maintained below the boiling point for the dryer vacuum. In chamber B, the fruit is dried in a first drying or heating zone by a high energy infrared and microwave heating bank 20. In chamber C, the fruit is dried in a second drying or heating zone by a low energy infrared and microwave heating bank 22. As hereinafter described in detail, the infrared energy is regulated by an infrared control unit 24 and optical sensor 26. In the illustrated embodiment the infrared heater of banks 20, 22 is controlled in unison. They may be controlled separately. The microwave energy in the two heating zones is separately controlled by a microwave energy control unit 28 and, in the illustrated embodiment of FIGS. 1 and 3, under control of radio frequency moisture meter 30. The infrared heaters and microwave generators can be fixed or controlled by temperature and/or moisture. In this first illustrated embodiment, the temperature at the end of the first heating zone B controls the infrared heaters in bank 20 and 22. The moisture in the discharge or rest zone D controls the microwave energy. This control is usually only in bank 22, but can be in both banks 20, 22. The ratio of heating can also be modulated by a microprocessor and the energy levels can be controlled by the same type unit. A series of observation ports 32 are longitudinally spaced on either side of the dryer 10 to permit visual inspection of the fruit as it passes along the conveyor 14.

Figure 1:
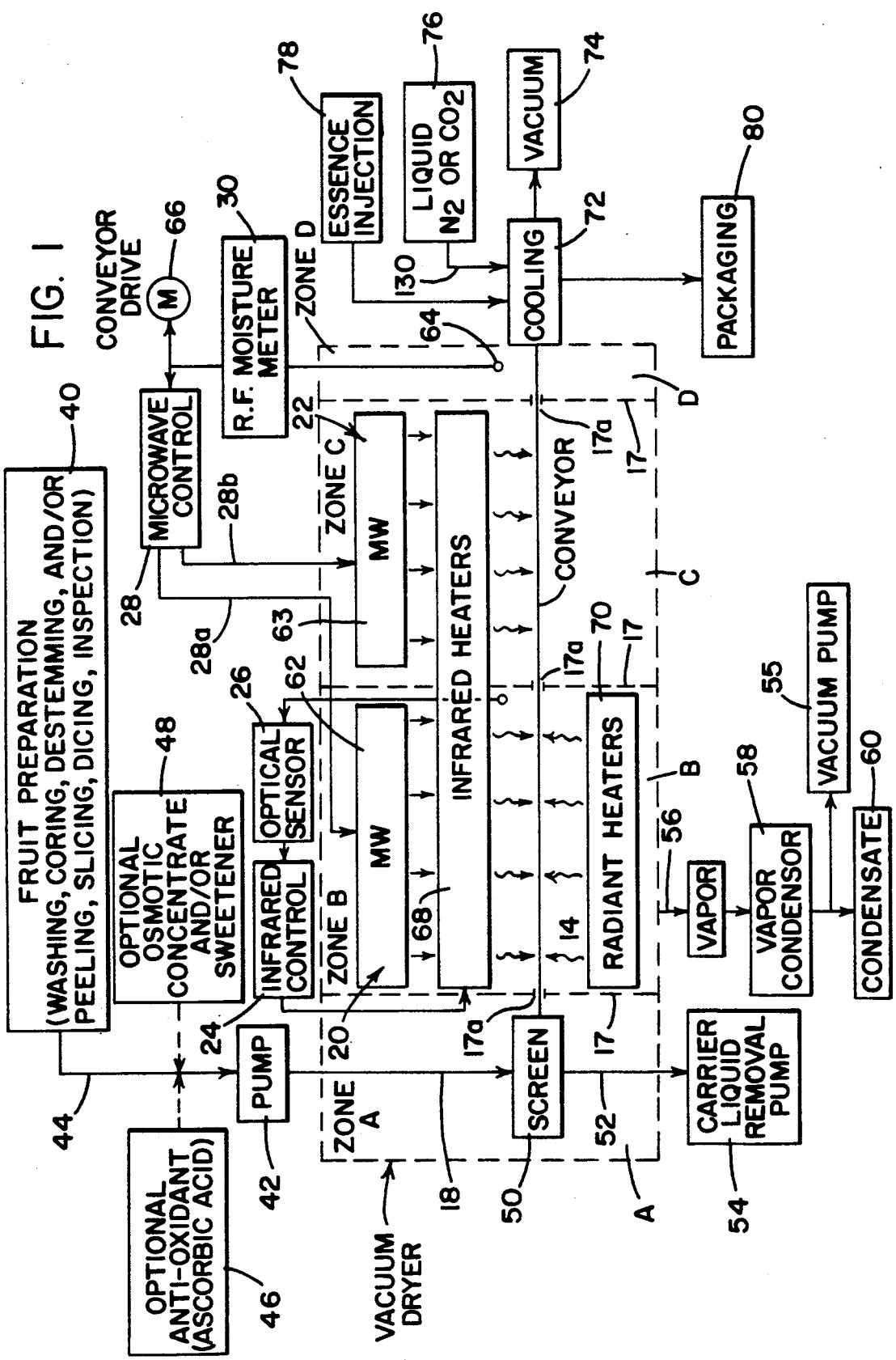
FIG. 1 is a process flow sheet of the vacuum dryer and method for dehydrating fruit in accordance with one embodiment of the present invention.

Referring to FIG. 1 showing the process flow diagram for dehydrating fruit in the preferred embodiment as it moves through zones A, B, C, D, in succession, whole fruit is suitably prepared in a processing stage 40. The carrier liquid is added and the combined mixture passes to a suitable pump 42 along line 44. As required, an antioxidant, such as ascorbic acid, may then be added from a supply 46 to line 44. Also an osmotic concentrate and/or sweetner may also be optionally added from a supply 48 to the line 44. Prior to the pump 42, the carrier mixture may be held in suitable storage vessels, not shown, prior to entry into the dryer.

The carrier mixture is discharged into chamber or feed zone A through the inlet pipe 18 and onto a separating screen 50. The screen 50 serves to separate the fruit from the carrier liquid with the latter being discharged through drain pipe 52 to a carrier liquid removal pump 54 exterior of the dryer. The carrier liquid may be reprocessed and recycled through the process. The fruit is discharged from screen 50 onto conveyor 14 for serial through chambers or zones B, C and D.

The dryer cavity is evacuated to a low absolute pressure of around 15-100 Torr by a suitable vacuum pump 55 through vacuum line 56. The vapor evolved during the drying process is condensed in a vapor condenser 58 upstream of a vacuum pump 55. The condensed vapor is discharged to a condensate sump 60. In the chambers or zones B and C, the fruit traveling along the conveyor 14 is subjected to internal heating by microwave generators or heaters 62 and 63, respectively of bank 20. The microwave generators or heaters 62 and 63 are controlled by the microwave control unit 28. The moisture meter 30 has a radio frequency sensor 64 in chamber or rest zone D that transmits a signal to the control unit 28 to vary the conveyor speed through control of conveyor drive motor 66 and/or to regulate the microwave energy levels in the various drying zones. In the preferred practice sensor 64 controls only the microwave energy of the last heating zone which has only a minor amount of final heating to accomplish.

In chambers or zones B and C, infrared heater shown as plate means 68 is effective for establishing a predetermined surface temperature for the fruit passing along the conveyor 14. Plate means 68 is formed as a series of spaced resistance heated plates forming, in esssence, a flat heating plate means extending parallel to the path of movement of the food product in zones B and C. The energy levels of the spaced plates forming plate means 68 are controlled by the infrared control unit 24. The optical sensor 26 is located intermediate the conveyor path in zone B and transmits a signal to the control unit 24 to control the level of infrared energy in zone B. An optical radiant heater 70 extends longitudinally below the conveyor 14 and is effective to heat the undersurface of the conveyor 14 to provide a belt temperature compatible with the drying process. The heater 70 may extend partially or completely along the upper belt run.

The fruit, dehydrated to a predetermined moisture content, passes to cooling pods 72 maintained under controlled vacuum by vacuum supply 74. Liquid nitrogen or carbon dioxide is controllably fed from a supply 76 to the cooling pods 72 for cooling the dehydrated fruit and for releasing the vacuum within the pods 72. An essence or flavor concentrate may be injected into the cooling pads 72 from a supply 78. The cooled, dehydrated fruit is discharged from the dryer to a packaging station 80 for further processing or packaging as required.

Referring to FIGS. 4-7, the dryer 10 includes an elongated cylindrical shell 82 having concave ends 84. The ends 84 are provided with manhole covers 86 for permitting access to the cavity interior. The walls of the shell 82 and the ends 84 are preferably of the stainless steel construction having a thickness and strength sufficient to provide the required structural rigidity under the applied vacuum. the dryer 10 is adapted to be fixedly mounted on a foundation by suitable supporting framework, not shown.

In the embodiment shown in FIGS. 4-7, the dryer 10 has an overall length of 100 feet with a diameter of 10 feet. The dryer 10 has a capacity for dehydrating a variety of fruit to a moisture content of less than 5% in a processing time of 15-60 minutes. By adjusting the time, the food product can be dried to a selected moisture content between about 2% to 10%.

Figure 4:
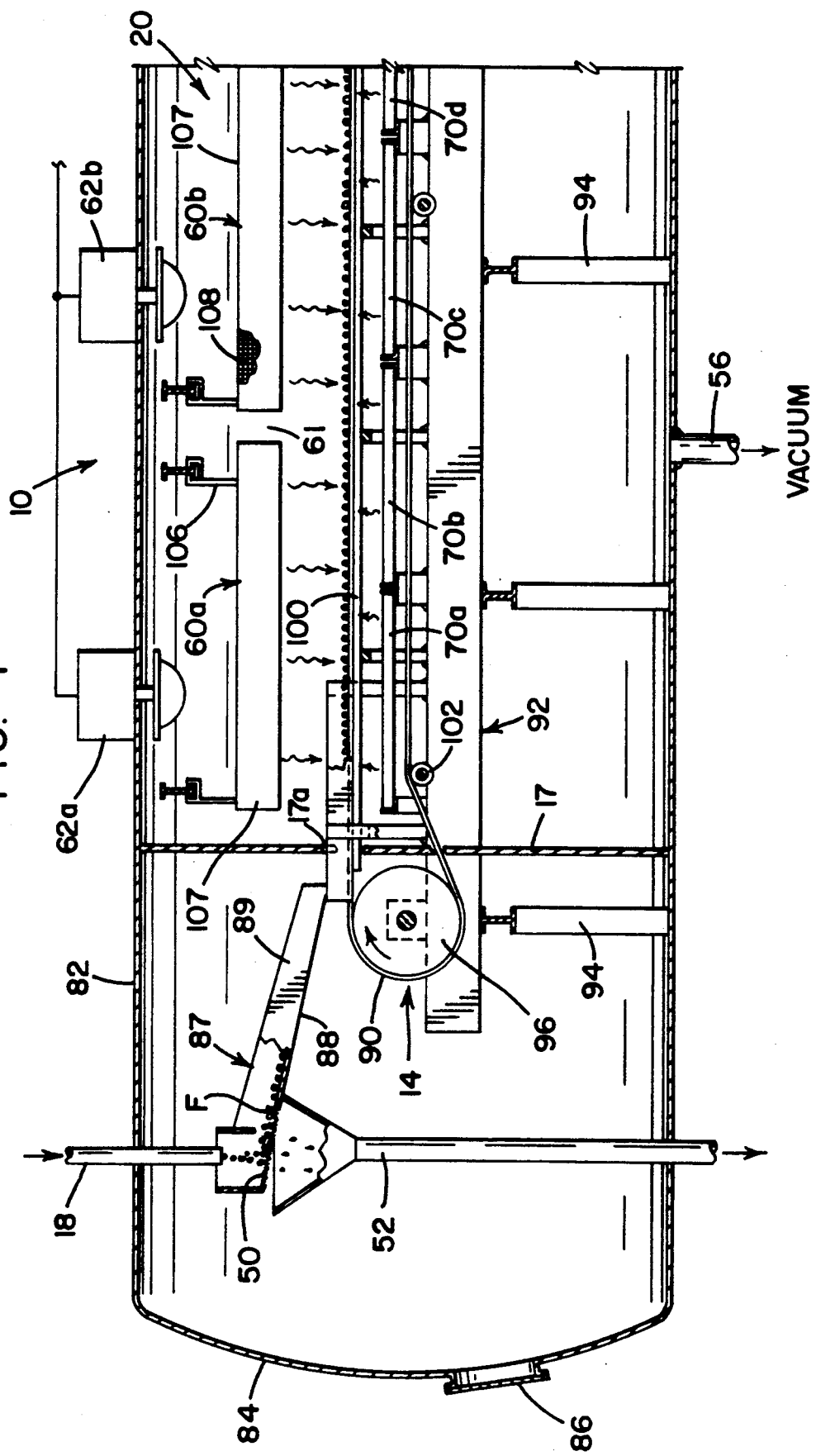
FIG. 4 is an enlarged sectional view of the inlet portion of the vacuum dryer.
Figure 6:
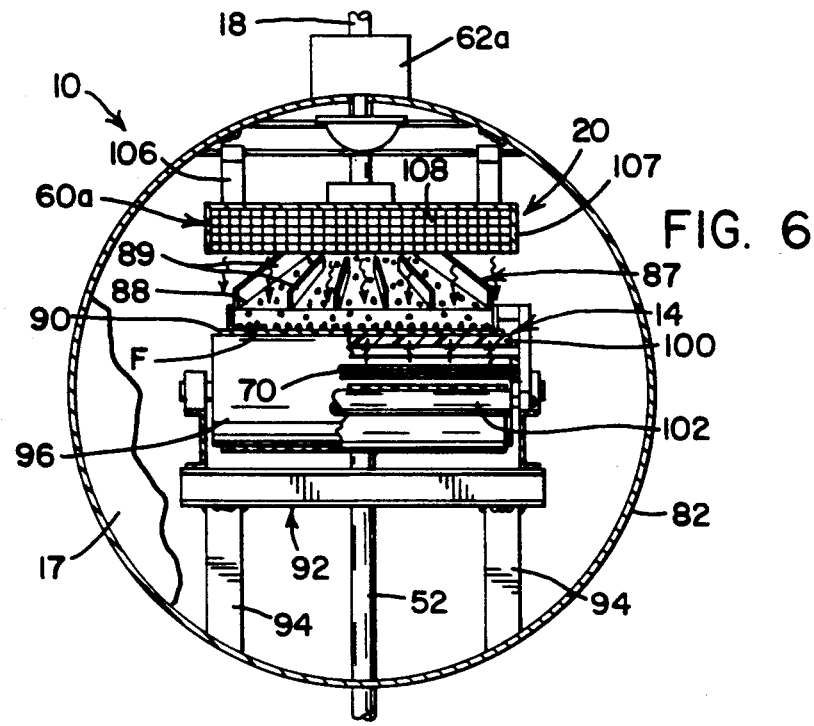
FIG. 6 is a cross-sectional view taken along lines 6—6 of FIG. 3.

Referring to FIG. 4, the carrier mixture is discharged from inlet pipe 18 onto an inlet chute 87. The chute 87 has a downwardly inclined base 88 having the separating screen 50 adjacent its upper end and upwardly extending sides 89. The carrier liquid is stripped from the fruit on the screen with a liquid downwardly discharging into an upper funnel section on the discharge pipe 52. The drained fruit F rolls or slides down the base 88 as shown in FIG. 6. Suitable conveying devices such as rotating separating screens may also be used for the separating and distributing of the fruit. The chute expands outwardly and includes vertically extending side walls and guiderails for uniformly depositing the fruit onto the conveyor 14. The fruit deposited by the chute 87 is longitudinally aligned at the entry end of the conveyor by the upwardly extending guide rails 89. The fruit thus passes from chamber or zone A to chamber B in a uniform width and depth distribution.

The conveyor 14 includes an endless belt 90 formed of a material suitable for food contact such as stainless steel sheet or mesh, woven fiberglass or plastic, such as Teflon. Conveyor 14 includes a longitudinal frame assembly 92 having downwardly depending legs 94 fixedly connected to the lower interior surface of the shell 82. The belt 90 is looped around end rolls 96 and 98 transversely positioned in zones A and D. The upper run of the belt 90 is supported between the rolls 96 and 98 by guide assembly 100. A series of longitudinally spaced idler rolls 102 rotatably connected to the frame assembly 92 support the lower run of the belt 90. The end roll 98 is operatively coupled to a drive assembly 104 mounted exterior of the shell 82. The drive assembly 104 includes the electric motor 66 for rotating the end roll 98 at a controlled speed as described is greater detail below, thereby effecting the desired conveyor belt speed and feed rate of the fruit through the chambers.

The microwave shields 17 are provided with transverse slits for permitting passage of the belt 90 and at the upper run with a height sufficient to permit additional passage of the fruit layer. The shields 17 extend diametrically within the shells 82 and are formed of a microwave impervious and/or reflective material, such as shinny metal sheet in order to effectively prevent the passage of microwave energy between adjacent chambers. These shields allow the microwaves to be reflected to cause random or scrambled wave patterns in zones B and C. Thus, these zones form microwave chambers with the amount of energy controlled to produce the desired internal heating Shields 17 have openings 17a that do not allow waves to pass into adjacent zones.

Figure 2A:
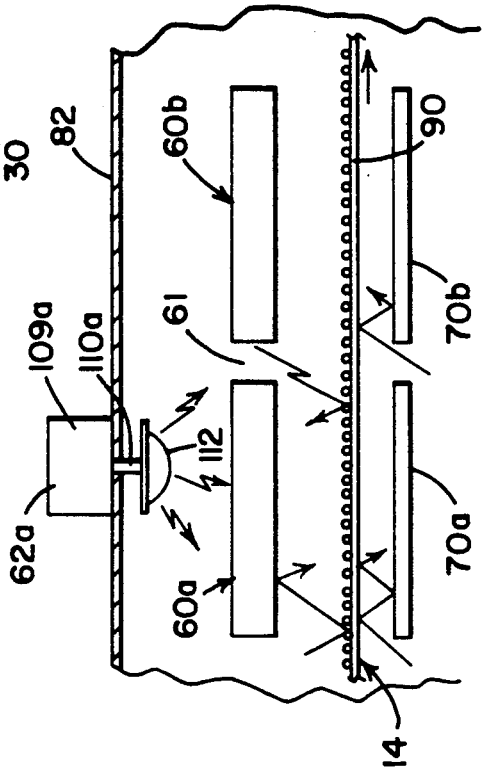
FIG. 2A is a partial side view showing operating features of the preferred embodiment of the present invention.
Figure 2:
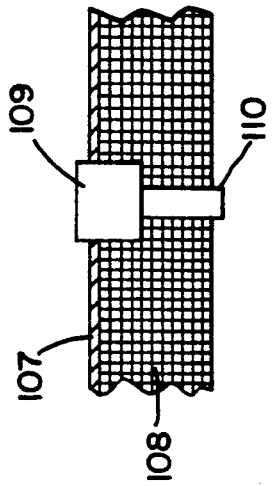
FIG. 2 is an enlarged fragmentary schematic view of a combined infrared heater and the microwave generator.
Figure 8:
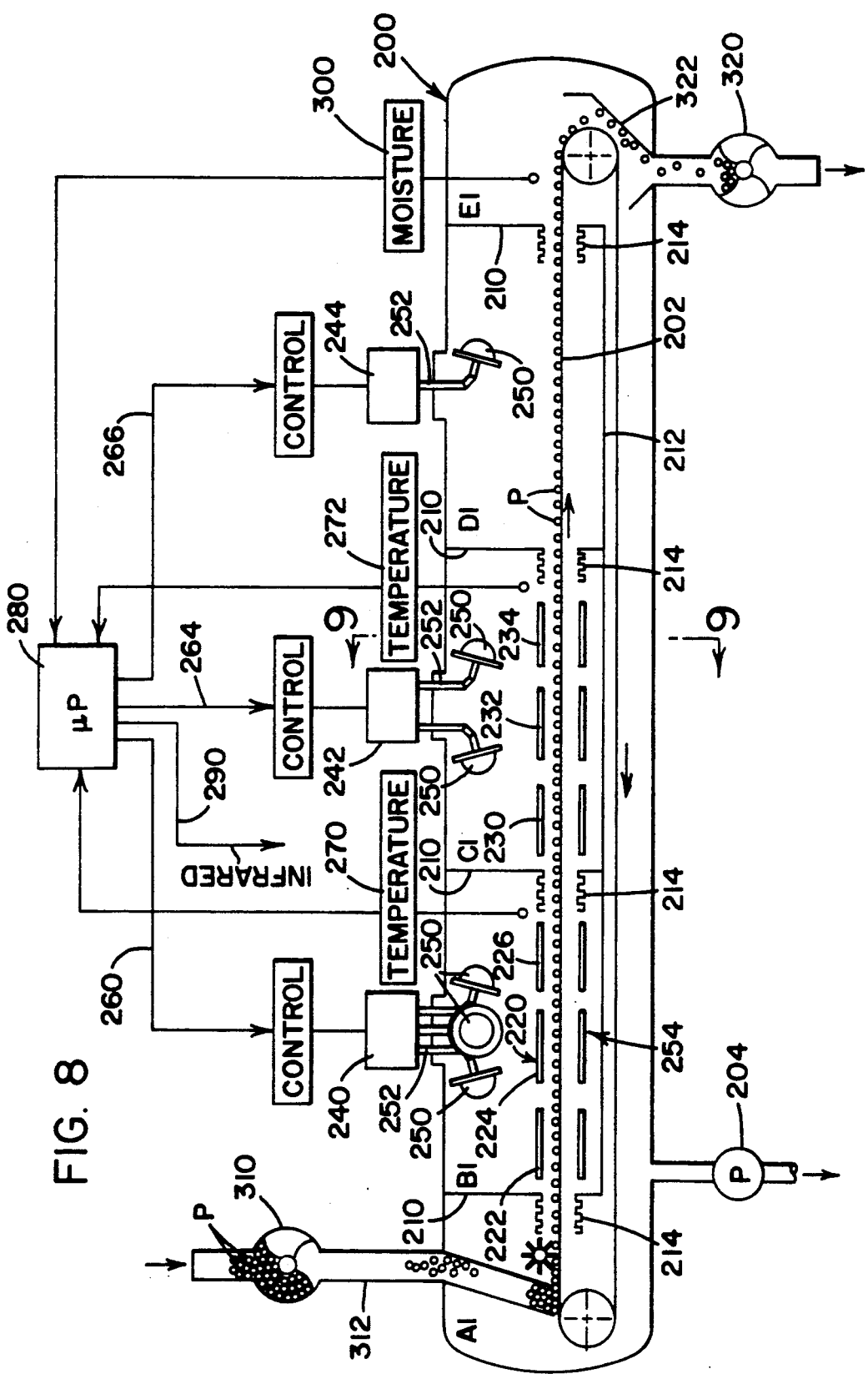
FIG. 8 is a schematic view of a further embodiment of the present invention showing multiple zones in the vacuum chamber, together with plate means used to separate initial heating zones for the purposes of simultaneously applying infrared heating and microwave heating in these two zones.
Figure 9:
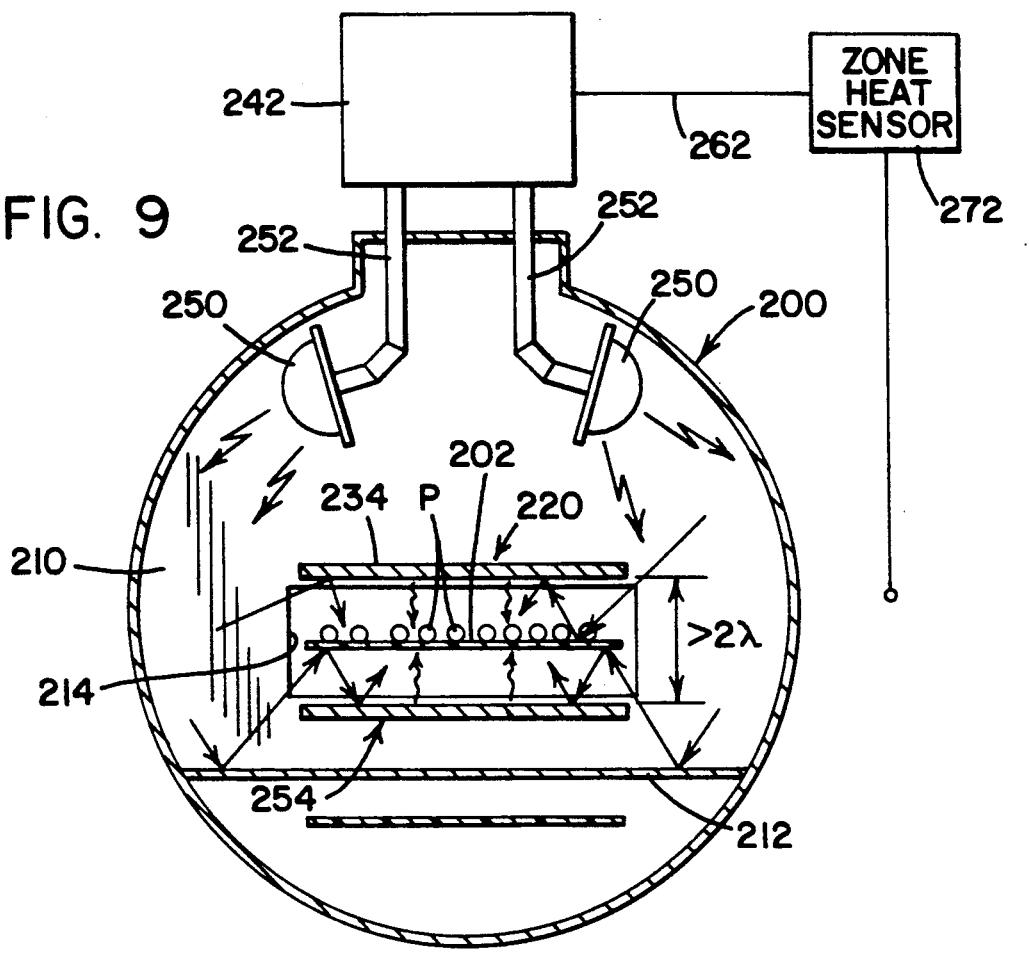
FIG. 9 is an enlarged cross sectional view taken generally along line 9—9 of FIG. 8.
Figure 10:
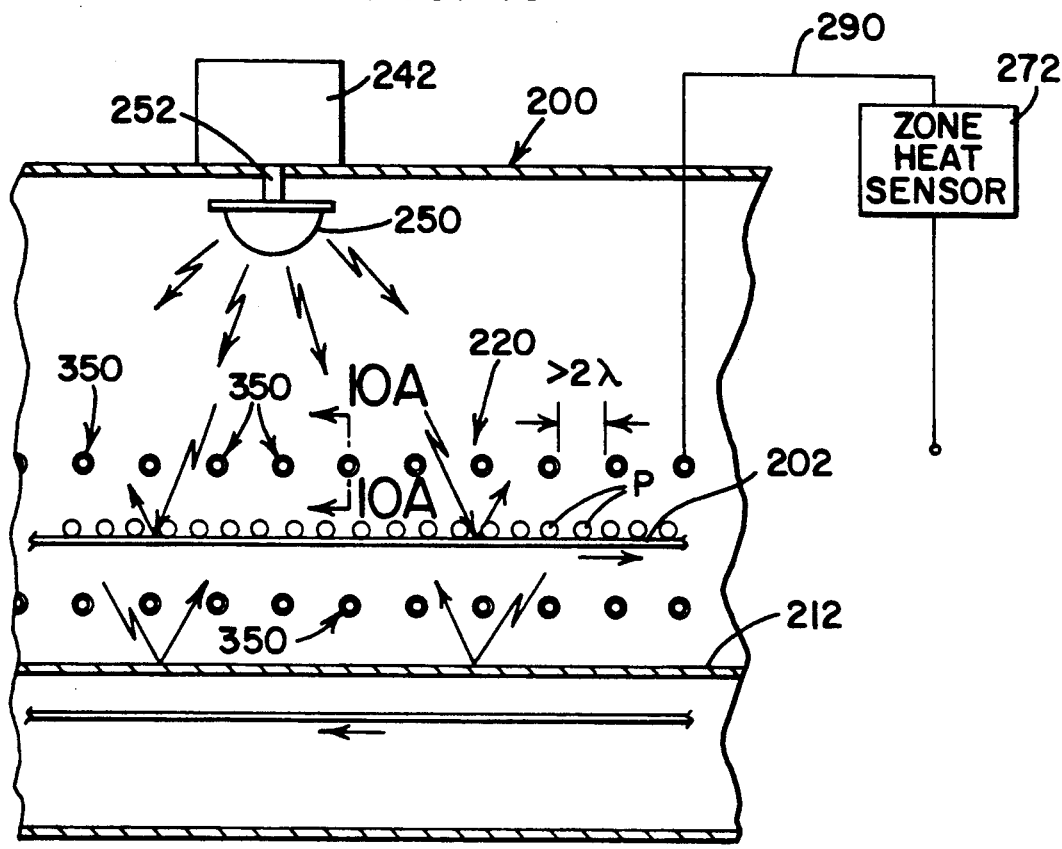
FIG. 10 is a partial cross sectional view showing the use of quartz heating elements for the plate means in the present invention.
Figure 10A:
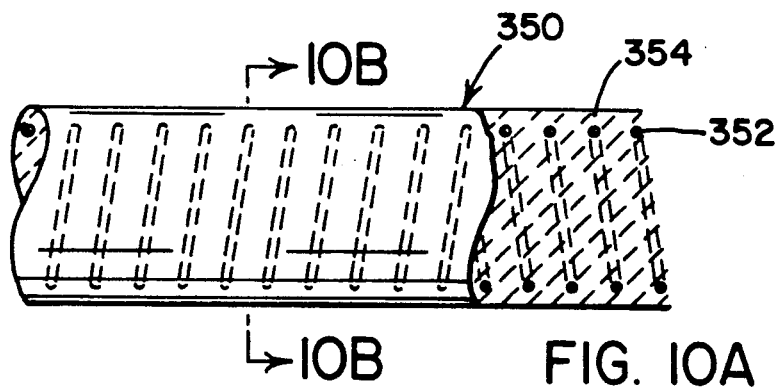
FIG. 10A is a further partial view showing certain details of the standard quartz heating element employed in the embodiment of the invention shown in FIG. 10.
Figure 10B:
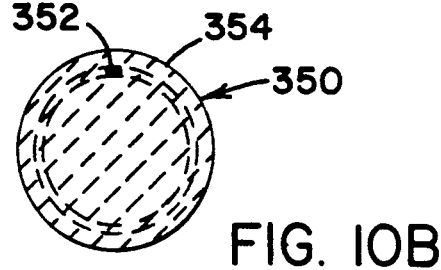
FIG. 10B is a cross sectional view taken generally along line 10b–10b of FIG. 10A.

Referring to FIGS. 2, 2A, 4 and 5, the heating banks 20 and 22 are supported above the belt 90 by means of hanger assemblies 106. Heating bank 20 includes a generally rectangular frame assembly 107 containing conventional infrared heating elements 108, such as quartz tubes, as shown in FIGS. 10, 10A, 10B, Cal rods, resistance panels or plates, as shown in FIGS. 8 and 9, or any suitable source of infrared radiation in the 1 to 20 micron wave length range. These elements are designated 60a, 60b-60x, 60y and combine to provide a heating plate means parallel with the moving food products on conveyor belt 90. The infrared heaters 60a, 60b-60x, 60y are located about 3 to 18 inches from the fruit. The microwave sources or generators 62a-d and 63a-d are longitudinally spaced along the heating banks 20, 22. Each microwave generator includes a microwave power supply shown schematically as device 109 in FIG. 2 with a downwardly depending wave guide 110 projecting through the vertical opening in heating elements 108, in the respective frame assembly 107. The wave guides are effective to direct the microwave for uniform distribution over the conveyor belt. FIG. 2 is schematic and shows the microwave extending through the plate means. In practice, the microwave generators 62 a and power supply 109 a are mounted as shown in FIG. 2A with wave guide 110a extending through the vessel wall to transmitter 112. One or more generators can be used in each zone. To provide more energy in the first zone B, more generators would be employed. Plates 60a, 60b, etc. are separated by openings 61 so that waves can easily reach the food product on belt 90. The lower radiant heater 70 is segmented into spaced plate members 70a, 70b.

The microwave power supplies are conventional units operating at frequencies that excite the water molecules to raise the internal temperature sufficiently to effect outward migration of the internal moisture. Generally, the frequency will be one of the typical microwave heating frequencies of 915 MHZ or 2450 MHZ.

Figure 5:
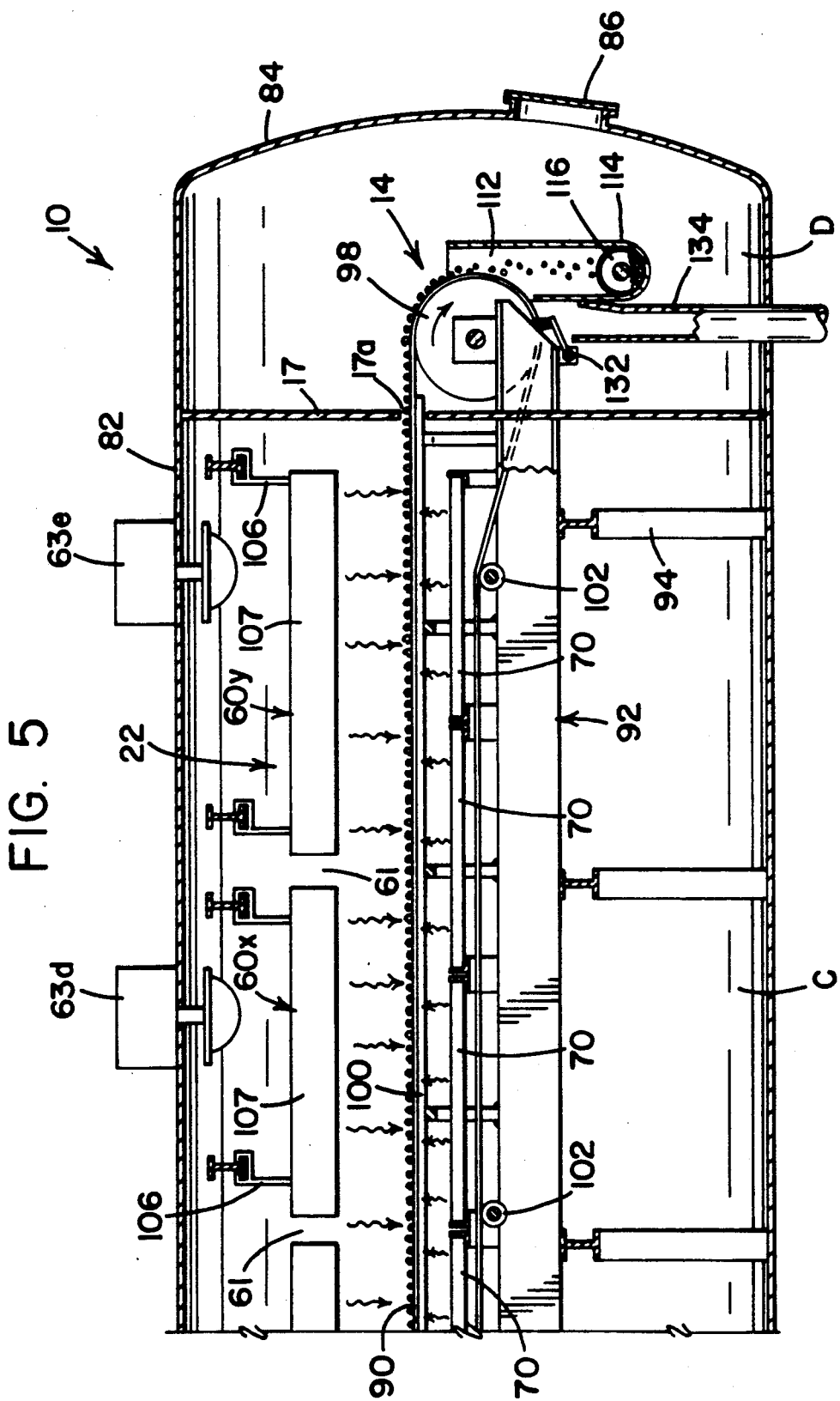
FIG. 5 is a sectional view of the outlet portion of the vacuum dryer.
Figure 7:
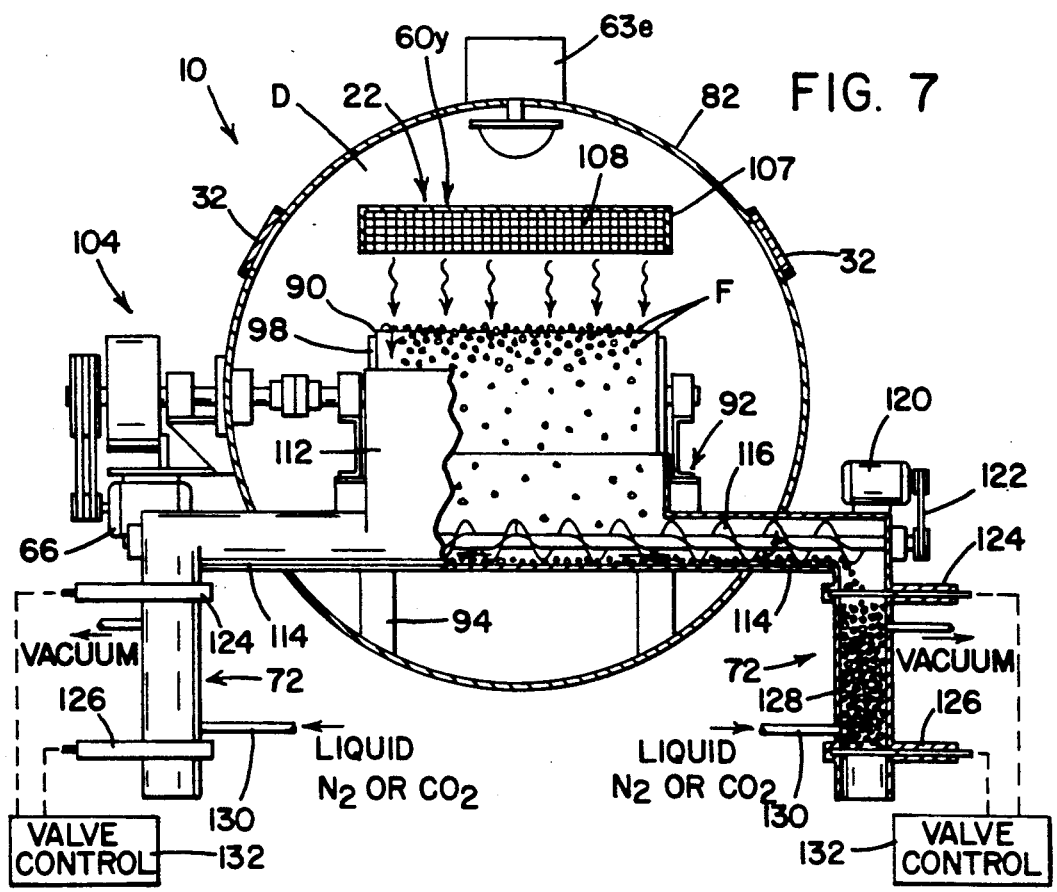
FIG. 7 is a partially sectioned view taken along lines 7—7 of FIG. 3.

Referring to FIGS. 5 and 7, the fruit, after passing through chambers B and C, enters chamber or rest zone D. The dehydrated fruit falls off the end of the conveyor belt into an upper opening of elongated hopper 112. The hopper 112 includes outwardly extending discharge tubes 114. A double helix feed screw 116 is retained at the base of the hopper 112 and within the tubes 114. An outer end of the screw 116 is operatively connected to an electric motor 120 by belt drive 122. The feed screw 116 is operative to move the dehydrated fruit to the vertical, generally cylindrical cooling pods 72.

The cooling pods 72 include an inlet gate valve 124 and an outlet gate valve 126 defining therebetween a cooling chamber 128. The cooling chamber 128 is evacuated to a low pressure of around 15-100 Torr by a vacuum supply, not shown. A suitably cryogenic liquid such as liquid nitrogen or carbon dioxide is fed through line 130 to the cooling chamber from the liquid supply 76. The operation of the valves 124 and 126 is suitably controlled by valve control 32. The upper gate valve 124 is opened to permit the chamber 128 to fill with dehydrated fruit and is then closed. The cryogenic liquid is then fed into the chamber 128 thereby cooling the dehydrated fruit to well below the plastic range to establish fruit rigidity. The resultant vaporization of the liquid is also effective to raise the pressure in the chamber 128 to atmospheric at which time the gate valve 126 is opened to permit discharge of the cooled dehydrated fruit to a subsequent operation.

The respective cooling pods 72 may be operated in phase opposed relation so as to alternatively receive, cool and discharge the fruit. This will obtain a balanced processing of the fruit. However, the pods also may be operated in phase relationship with both pods receiving and discharging the fruit. Any fruit or liquid adhering to the belt surface is removed by scraper assembly 132 for downward discharge into a scrap bin 134.

OPERATION OF THE VACUUM DRYER IN FIGS. 1-7

To dehydrate fruit, the vacuum pump 55 is energized to evacuate the drying chamber to a vacuum pressure of about 15-100 Torr. Depending on the fruit to be dried insofar as size and moisture content is concerned, the conveyor 14 as driven by the motor 66 is regulated to provide a suitable processing time generally in the range of 15-60 minutes first heating zone B comprises about 40-50% of the length of the tunnel and is suitable for reducing the product moisture levels to 6-15%. The second heating zone C is effective to reduce the moisture to the required dehydration content, generally 5% or below. This heating requires an additional 40-50% of the conveyor length. The conveyor length in zone A is sufficient to evenly distribute the fruit on the conveyor. Zone D has sufficient length to permit moisture measurement of the fruit exiting the dryer operations, such that conveyor speed or heating may be regulated to maintain the desired exiting on processing requirements, additional heating zones may be employed.

The microwave units or generators 62a-d are energized to supply a high watt density in zone B sufficient to internally heat the fruit and effect migrate on of the moisture outwardly through diffusion or capillary action at a rate sufficient to achieve the intermediate moisture content. The infrared heater or plate means 60a, 60b, etc. in zone B is energized to establish a radiantly heated surface temperature sufficient to evaporate the exiting water at a temperature within the plastic range of the fruit but below the point at which surface browning or spotting occurs. Generally, this temperature will be in the range of 30° C.-95° C. dependent on the applied vacuum. By means of the optical sensor 26 and the control unit 24, the infrared heating level is appropriately maintained in a feedback control manner. The temperature at the exit end of zone B controls the heating by radiant heat. If high heat inertia plate means are used, such as resistance plates, sensor 26 may control the microwave generator or generators in first heating zone B. Radiant heating and microwave heating is tuned so that the rate at which the moisture is driven from the food product in zone B is matched by the evaporation rate assisted by the infrared heaters 60a-d. The moisture has a higher diffusion rate than the organic fragrance compounds; therefore, the fast drying in zone B traps the taste but extracts the moisture. The under belt radiant heaters 70 are effective to maintain the belt temperature within the plastic range of the fruit being processed.

In zone C, with the fruit in a partially dried condition, the product watt density from the microwave heaters or generators is significantly reduced but is sufficient to maintain a steep moisture gradient from the interior to the exterior. The energy of infrared heating plates 60x, 60y, etc. may be maintained at the predetermined level to produce optimum evaporation at the cavity vacuum without adverse product effects.

Preferably, the microwave control 28 is provided with an input from moisture meter 30 in chamber or zone D. The meter sensor scans the exiting fruit and trasmits a signal to the control unit 28 in accordance therewith. The control unit 28 functions to alter the microwave energy levels, preferably in only zone C. the sensed moisture content could be used to control the conveyor drive speed by adjusting motor 66 to maintain the exiting moisture content at the desired level. Of course, the moisture content could be used to control the microwave generators in zone B as schematically illustrated as control lines 28a, 28b in FIGS. 1 and 3.

In a similar fashion, the optical sensor 26 measures a surface temperature at an intermediate location of the conveyor path near the end of zone B. The sensor transmits a signal to the infrared control unit 24 for adjusting the intensity of the infrared energy to the optimum surface temperature in zone B. It should be appreciated that a plurality of optical sensors may be provided along the conveyor path to control the surface temperature in each zone. In addition to the meter signal correlated to conveyor speed, additional temperature meters or moisture meters may be provided along the path for regulating the microwave energy levels in various energy zones.

The dried fruit discharged at the cooling pods 72 will be dependent on the through-put of the dried fruit. The gate valves 124 are appropriately actuated to admit fruit in accordance with the delivered volume. However, they may be sufficiently sized so as to operate at predetermined timed intervals. The amount of cooling liquid injected into the cooling pods 72 will be sufficient to rapidly cool the fruit from the plastic temperature range to a stable structural temperature while at the same time being vaporized to raise the pod pressure to around atmospheric levels. The amount of essence compound injected into pod 72 will be dependent on the overall flavor characteristics desired for the dehydrated fruit. A dryer operated in accordance with the foregoing will continuously produce dehydrated fruit which is firm without a tough or rubbery texture. The fruit retains the original color and possesses the flavor of the fresh fruit. Because of the radiant heating, a sealing effect is also obtained resulting in low levels of hygroscopicity thereby providing extended flavor retention.

EXAMPLES I

A dryer such as shown in FIGS. 1-7 was equipped with a fiberglass/Teflon endless conveyor belt and evacuated to a pressure of 40-50 Torr. Quartz infrared tubes, as shown in FIGS. 10A, 10B, were positioned 14 inches above the belt The tubes were wired in three separate banks, each of which was controlled by voltage controller. The controller was effective to vary the voltage and thus the surface temperature, in response to an optical sensor 26 focused on the product. Apple dices $\frac{1}{2}''\times\frac{1}{2}''\times\frac{3}{8}''$ were uniformly deposited on the conveyor belt at a loading of about 5 kilograms per square meter. The apple dices had been previously osmotically treated with sucrose syrup so that the solids content was about 34%.

Analysis of the product indicated that 75% of the moisture was evaporated at 40% of the cycle The optical sensors 26 maintained the surface temperature at or below 95° C. The belt speed was adjusted to provide a 42 minute cycle to dehydrate the dices to an average moisture content of 3%. The dices, after cooling, were crisp, puffed, light in color and with a natural apple flavor.

EXAMPLE II

The dryer described in Example I was divided into four treatment zones, not including the feed zone, as shown in FIG. 8. Zone 1 comprised 45% of the length of the tunnel, zone 2, 25% of the length, zone 3, 25% of the length and zone 4 was a rest zone comprising the remainder of the length.

Each of the first three zones was additionally equipped with microwave energy heaters. Each one was controlled separately.

Apple dices, as in Example I above were deposited on the belt so that the loading was about 15 kilograms per square meter with an average bed depth of 2.5 centimeters. Microwave energy was introduced so that the watt input did not exceed 25 watts per cubic centimeter of product. The infrared energy was controlled so that the product temperature did not exceed 85° C. By trials, it was determined that the moisture content of the dices at the end of the first zone was around 14-15%. Microwave energy, in succeeding zones, was considerably reduced. The moisture meter constantly scanned the product in the rest zone to obtain product dehydrated to 3% moisture. The cycle time for the combined process was 20-24 minutes.

OTHER EXAMPLES

The above product was of excellent quality with a crisp texture and very uniform in color and moisture content. Other tests made following the parameters of Examples I and II above were conducted using peach dices, banana slices and strawberry slices at various levels of soluble solids. In each case, the dehydrated fruit exhibited distinctive uniform puff characteristics as contrasted to a hard shrunken appearance of conventionally dehydrated pieces. The power input, belt loading and cycle times were all matched to the product being dehydrated and its entering moisture characteristics.

EMBODIMENT OF FIGS. 8-10

Figure 11:
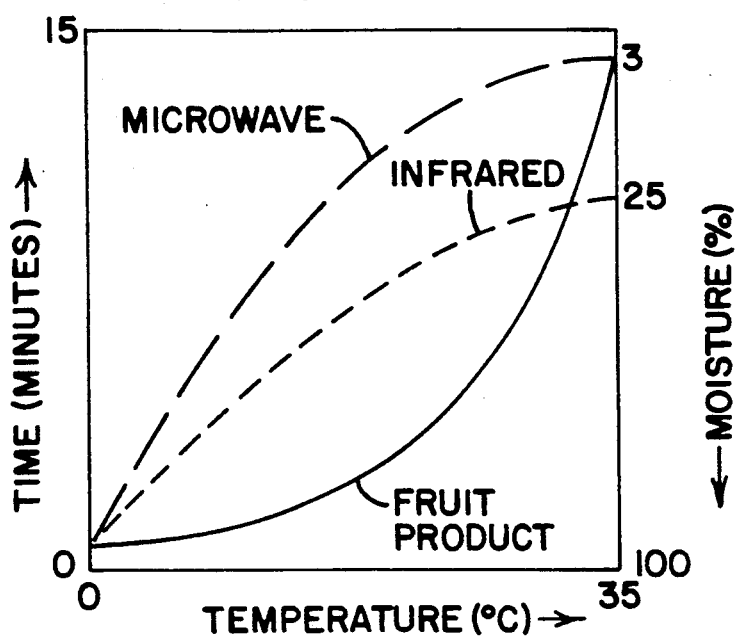
FIG. 11 is a graph showing the relationship between the amount of microwave heating and infrared heating as a function of time to schematically illustrate heating of a food product in accordance with the present invention.

Referring now to FIGS. 8-10, a multiple stage application of the present invention is illustrated wherein an elongated vacuum vessel 200 is provided with a transversely extending conveyor 202. Appropriate vacuum pump 204 evacuates vessel 200 to maintain the vessel in accordance with the vacuum restraints previously discussed. Vessel 200 is divided into a feed zone A1, three successive heating zones B1, C1 and D1 and a rest or discharge zone E1. These zones are divided by longitudinally spaced shields 210 coacting with a bottom shield 212 to define separate and distinct vacuum microwave heating chambers B1, C1 and D1. Shields 210 are provided with appropriate shielding tunnels 214 for the purpose of preventing stray microwave radiation from the various heating chambers. To provide radiant heating, there is a longitudinally extending plate means 220 made up of a plurality individual flat resistance plates 222, 224, 226 in heating chamber B1 and plates 230, 2321 and 234 in heating chamber C1. These plate means in the two chambers provide radiant heating for the food product P as it moves in a preselected path through vessel 200 on the top run of conveyor 202. Microwave generators 240, 242 and 244 are provided in the heating chambers to direct microwave energy into the chamber through an appropriate number of microwave heads 250 each provided with a wave guide 252 extending from outside the vessel. In the illustrated embodiment, three heads 250 are shown in zone or chamber B1, two heads are in zone C1 and only a single head is in zone D1. As previously described, progressively reduced microwave heating of product P allows reduction in the residence time and in the length of the heating process. The more moist food product in zone B1 is subjected to a substantially greater amount of microwave heating than the progressively drier product in zones C1, D1. In this manner, the rapid water migration in zone B1 allows extraction of water while the aromatic organic fragrance compounds in the product are captured and do not migrate in an appreciable extent during the rapid heating process. This captures the fragrance and fresh taste of the fruit product as it is dried rapidly in zone B1. Of course, radiant heating in this zone must be sufficiently high to balance the temperature gradient through the food product and to assure evaporation of the liquid as it migrates through the outer surface of the food product being subjected to the relatively high microwave heating. The correlation of infrared heating and microwave heating is schematically illustrated in FIG. 11. To make the food product increase in temperature, the amount of microwave heating is increased. In addition, the necessary amount of infrared heating must be increased to balance and provide a synergistic action in the moisture extraction process. The lower radiant heating plates 254 heat the under side of the conveyor belt and may take a variety of forms. In the illustrated embodiment, these lower plates are similar to the upper heating plates in plate means 220 and are spaced from these plate means a distance greater than two wave lengths of the microwave energy. This assured that there is no shielding effect created by the spaced radiant heating plates above and below the food product as it is being progressed through the heating zones. In accordance with the present invention, the plates forming plate means 220 are in segments and are spaced from each other a distance greater than two wave lengths so that microwave energy can easily be reflected through the spaces between adjacent plates 222, 224, 226 and 230, 232 and 234. The same spacing is provided in the lower radiant heating plates 254.

As illustrated in FIG. 9, the microwave heating in the heating chambers occurs in accordance with standard practice and the waves are reflected from all surfaces to encompass the food product P as it moves through the heating zones. Most of the material in the heating zones is reflective of microwave energy except for the food product itself which is a lossy material. Consequently, as the microwave energy is created and ricochets between the various surfaces, only the lossy food product is heated to a substantial extent. The radiant heating has effect upon all of the various materials within the chamber; therefore, it is relatively closely spaced to the food product since the radiant heating is a factor of the square of the distance. Spacing from the food product is about one wave length as illustrated in FIG. 9. Spacing of the heating elements from the vessel walls is substantial to reduce the heating effect of the radiant heating caused by plate means 220 on the vessel 200.

To control the energy levels of the microwave heating and the infrared heating in the heating zones, there is provided a schematically represented control system in FIG. 8. The energy level of the microwave heating is controlled by signals in lines 260, 264, 266 directed to appropriate control devices for the infrared generators 240, 242 and 244, respectively. These energy levels can be manually set to the desired values. In accordance with an aspect of the invention, temperature sensors 270, 272 are provided. These sensors are directed to a standard microprocessor 280 to provide a feedback control system wherein the temperature at the exit ends of zones B1, C1 can control the rate of drying in these respective zones. Microprocessor 280 also has an output control line 290 which controls the temperature level of plate means 220. The total plate means can be controlled as a unit or separately controlled in zones B1, C1. The temperature sensed by device 270 is read by microprocessor 280. This value is applied to a mapping arrangement in the memory of the microprocessor which may have a function similar to the curves shown in FIG. 11. As the sensed temperature changes, the amount of microwave heating is modified. Of course, as previously described in the first embodiment of the invention, this temperature sensor can change the temperature of plate means 220 by an appropriate control signal in output line 290 of microprocessor 280. Thus, the energy levels of the microwave heating and radiant heating in zone B1 is controlled in accordance with the temperature sensed in device 270. In a like manner, the radiant heating and microwave heating in zone C1 can be controlled by the temperature sensed by device 272 through output line 262 . A basic overriding control may be a radio frequency moisture detector 300 detecting the moisture content of food product P in rest zone E1. This moisture reading is directed to microprocessor 280 which controls the energy level of microwave generator 244 in zone D1. In accordance with the preferred embodiment of the invention, only zone D1 is modulate to control the final moisture output. However, if modulation of the microwave energy applied to the relatively dry food product in zone D1 does not control the moisture content, appropriate adjustments can be made in zone C1. If this is not sufficient to compensate for the deviation of moisture, control in zone B1 can be effected. All of this is processed in accordance with standard microprocessor control procedure employing appropriate maps such as schematically illustrated in FIG. 11.

Referring now to FIGS. 10, 10A, and 10B, a slight modification of the embodiment of the invention shown in FIGS. 8 and 9 is illustrated. In this modification, a plurality of transversely extending quartz heating elements 350 are assembled in a parallel plane above the food product P and form the plate means 220 previously described. These quartz rods or heating elements are spaced from each other a distance allowing the microwave to easily penetrate through the plate means 220 into the food produce P on conveyor 202. In accordance with standard practice, these quartz heating elements are well known and are only schematically illustrated in FIGS. 10A, 10B as including an internal heating element usually a tungsten wire 352 surrounded by a quartz envelope 354. The advantage of employing this particular type of radiant heating device is that they have relatively low heat inertia. When energy is applied to the heating elements 352, the elongated transversely extending rods or elements are immediately raised to a white hot temperature. When the energy is removed, they are immediately cooled to a relatively low temperature not causing radiation. As is known, radiation is determined by the difference between the temperature of the radiating body and the temperature of the body to which radiation occurs. When the energy is removed from the heating elements of the quartz rods or elements, the temperature of the transversely extending, spaced rods is reduced below the temperature of the surrounding material effectively stopping any radiation. Thus, by pulsating the rods on and off at different duty cycles very accurate control can be maintained over the radiant heating. By using this concept, it is conceivable to generally fix the microwave heating and modulate the radiant heating to control the desired temperature as sensed by device 272 as schematically illustrated in FIG. 10.

In accordance with an aspect of the present invention as illustrated in FIG. 8, a rotary vacuum inlet valve 310 is provided with a series of machined metal blades riding directly upon the inner cylindrical surface of the valve 310. This allows food product P to be dropped into chute 312 by way of valve 310 without loss of the vacuum. A similar valve 320 is provided at the exit end in rest zone E1. Collector 322 directs dried product into valve 320 for discharge from the drying apparatus.

OPERATING GRAPHS

Figure 12:
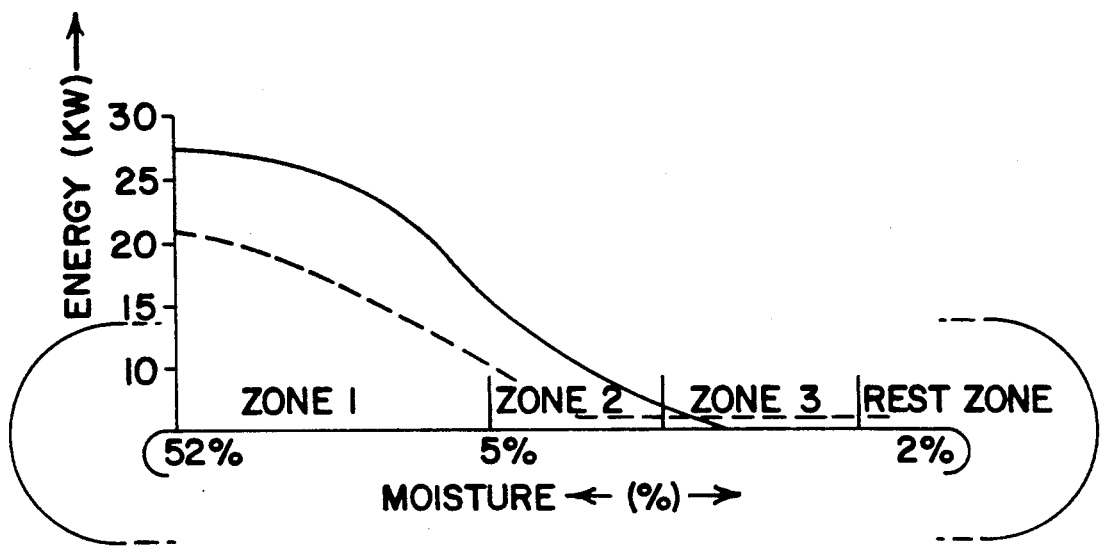
FIG. 12 is a graph showing the relationship of infrared heating and radiant heating through the various zones of the embodiment of the invention illustrated in FIG. 8.
Figure 13:
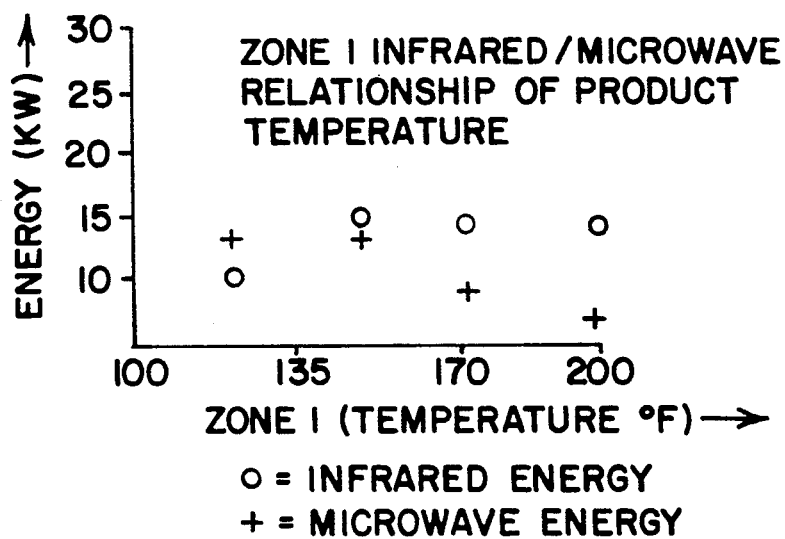
FIG. 13 is a graph showing the relationship between microwave heating and infrared heating at different product temperatures in the first heating zone of the embodiment of the invention shown in FIG. 8.

FIGS. 12 and 13 illustrate certain operating characteristics of the present invention with three heating zones as in FIG. 8. In the first heating zone, high infrared and microwave heating takes place. This is shown in FIG. 12. In the last zone there is no appreciable radiant heating and the microwave heating is adjusted to produce the desired output moisture content. As can be seen, as the microwave increases, the radiant heating increases to balance the extraction of liquid from the surface of the food product. In FIG. 13, details of the first heating zone are schematically illustrated. The microwave heat predominates when there is a low set product temperature. As the set temperature increases, the amount of microwave heating decreases while the radiant heating increases This causes the balancing effect at each temperature so that the extracted liquid caused by internal heating with the microwave energy is efficiently removed by surface evaporation, which is increased by increasing the radiant heating temperature. If the radiant heating temperature is maintained constant, then the microwave heating is adjusted to obtain this result. In a like manner, the microwave heating can be maintained at a generally fixed relationship and the radiant heating adjusted by the output sensing devices especially when using a low heat inertia heating element such as quartz elements.

EMBODIMENT OF FIGS. 14 AND 15

Figure 14:
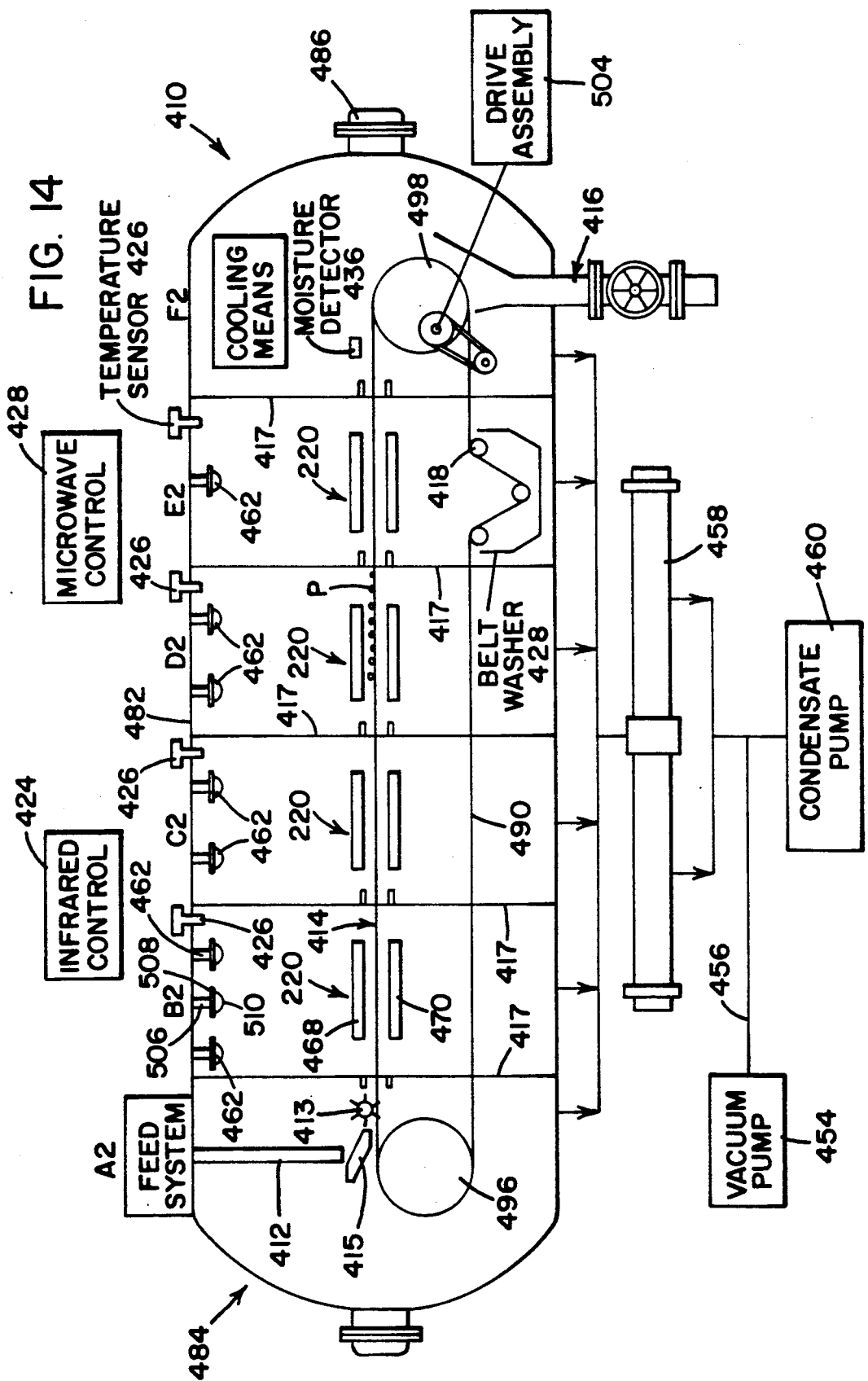
FIG. 14 is a schematic side elevational view of a commercial embodiment of the present invention; and, FIG. 15 is a block diagram similar to FIG. 1 showing other controllable features which can be used in the present invention and as employed in the commercial embodiment of the invention shown in FIG. 14.
Figure 15:
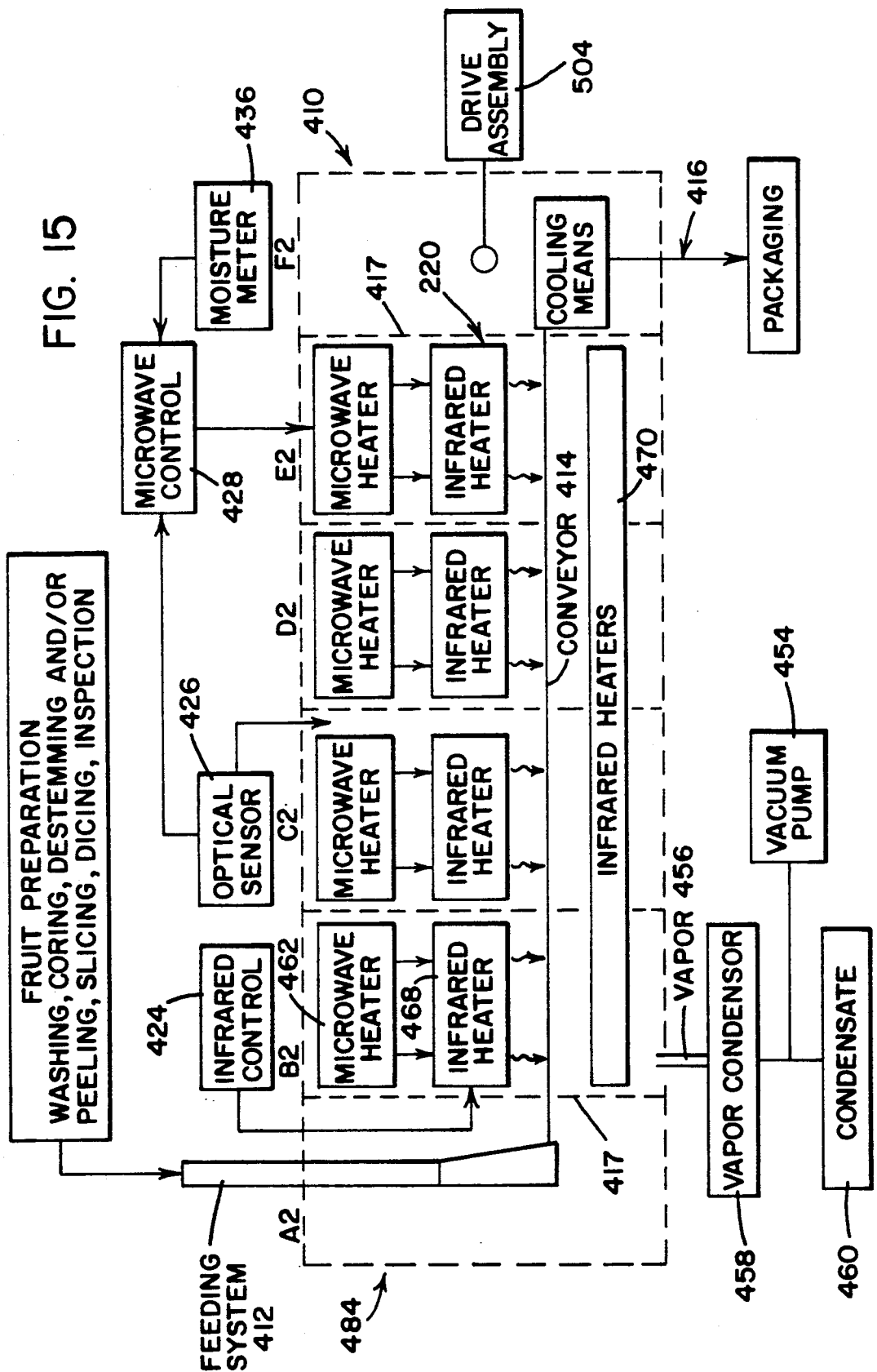

Referring now to FIGS. 14 and 15, they generally show a vacuum dryer 410 for dehydrating pieces or other food products. The fruit pieces enter the dryer 410 through a vertical inlet pipe 412 of the inlet means 484 and are discharged onto a conveyor 414 for continuously moving the fruit pieces P along a longitudinal path from an inlet chamber A2, through high energy drying chambers or zones B2 and C2 and low energy drying chambers or zones D2 and E2, to a discharge chamber or cooling zone F2 where the dehydrated fruit pieces are removed through outlet means 416. The chambers are mutually separated by radiation shields 417.

The temperature of the carrier liquid for the food product is maintained below the boiling point for the dryer vacuum, and the fruit pieces are separated by a screen 415 from the carrier liquid prior to being deposited onto the conveyor 414. Alternatively, the fruit juices may be deposited directly on the conveyor 414. The dryer 410 may be provided with a belt washer 428 which rinses the conveyor belt 414 each time the conveyor belt 414 completes one full cycle.

In chambers B2 and C2, the fruit is dried by high energy infrared and microwave heating units. In chambers D2 and E2, the fruit is dried by low energy infrared and microwave heating units. The infrared energy is regulated by an infrared control unit 424. The microwave energy is controlled by a microwave energy control unit 428 and optical temperature sensors 426 and/or radio frequency moisture meter 436.

The drying chamber 410 is evacuated to a low absolute pressure of between about 15 and about 100 Torr by a suitable vacuum pump 454, through vacuum line 456. The cavity can be maintained at higher than 100 Torr, but preferably should be between about 50 and about 60 Torr. The vapor evolved during the drying process is condensed in a vapor condenser 458 upstream of a vacuum pump 454. The condensed vapor is discharged to a condensate sump 460. In the chambers B2, C2, D2 and E2, the fruit traveling along the conveyor 414 is subjected to internal heating by microwave heaters 462. The microwave heaters 462 are controlled by the microwave control unit 428. The optical temperature sensors 426 in chambers B2, C2, D2 and E2 transmit a signal to the control unit 428 to regulate the microwave energy levels in the various drying zones. Additionally, a moisture meter 436 in chamber F2 is used to indicate any deviation in the fruit pieces from a desired moisture range any may also be used, if desired, to control energy input in the last energy zone.

In chambers B2, C2, D2 and E2, infrared heaters 468 are effective for establishing a predetermined surface temperature for the fruit passing along the conveyor 414, which is usually between about 95° F.–203° F. The energy levels of the heaters 468 are controlled by the infrared control unit 424. An infrared heater 470 extends longitudinally below the belt 414 and is effective to heat the undersurface of the belt 414 to provide a belt temperature compatible with the drying process. The infrared heater 470 may extend partially or completely along the upper belt run depending upon design considerations for the placement of the microwave and infrared energy units.

The conveyor 414 includes an endless belt 490, which may be of a solid or an open-weave type. The belt 490 is looped around end rolls 496 and 498 transversely positioned in chambers A2 and F2. "A dancer roll assembly 418 is mounted on the lower run in belt washer means 428 and tensions the belt 490." The drive assembly 504 includes an electric motor (not shown) for rotating the end roll 498 at a predetermined speed to control the feed rate of the fruit pieces through the chambers.

The shields 417 are provided with transverse slits for permitting passage of the belt 490 and at the upper run with a height sufficient to permit additional passage of the fruit layer. The shields 417 extend within the shell 482 and are formed of a microwave impermeable and reflective material, such as metal sheet, in order to effectively prevent the passage of microwave energy between adjacent chambers.

"The dryer 410 includes an elongated shell 482 having concave ends. The ends are provided with manhole covers 486 for providing access to the cavity interior."

The conventional infrared heating elements 468 forming plate means 220 may be positioned within rectangular shaped heating banks (not shown) which are supported above the belt 490 by means of hanger assemblies (not shown). The infrared heating element or plate means may be selected from among a group of parallel quartz lamps, a number of parallel spaced rods, a succession of spaced or continuous panels or any other suitable source of infrared radiation in the 1 to 20 micron wavelength range. The infrared heaters 468 are located in a parallel plane about 3 to 18 inches from the fruit but this distance may vary depending upon the type of infrared heat source used and various design parameters which render the infrared heaters compatible with microwaves.

The microwave energy is introduced into the chambers or heating zones B2, C2, D2 and E2 through wave guides 506, attached to parabolic horns, microwave heads or transmitters 508 sealed with polypropylene covers 510 against atmospheric pressure. However, any other suitable means for introducing microwaves into the chamber may be used. The microwave power supplies (not shown) are conventional units operated at frequencies that excite the water molecules so that the internal temperature of the lossy fruit pieces is sufficiently raised to effect outward migration of the internal moisture Generally, the frequency will be one of the typical microwave heating frequencies of 915 MHZ or 2450 MHZ.

After the fruit pieces have passed through chambers D2 and E2, the fruit pieces enter chamber F2 for cooling. The fruit pieces may be cooled directly on the belt or transferred to separate cooling units or pods located outside of the dryer 410.

OPERATION OF THE VACUUM DRYER

The first heating zone B2 is suitable for reducing the moisture level in the fruit pieces to between about 25% and about 30%. The second heating zone C2 is effective to reduce the moisture level of the fruit pieces to between about 10% and about 15%. The third heating zone D2 further reduces the moisture level of the fruit pieces to between about 4% and about 8%. The final heating zone E2 effectively reduces the moisture level of the fruit pieces to less than 5% The conveyor length in chamber A2 is sufficient to evenly distribute the fruit pieces on the conveyor 414. Depending upon processing requirements, additional or fewer heating zones may be employed.

The microwave heaters 462 are energized in chambers B2 and C2 to internally heat the fruit pieces and effect migration of the moisture outwardly through diffusion or capillary action, at a rate sufficient to achieve the intermediate moisture content. The amount of microwave energy in each zone is selected to provide the highest water migration rate consistent with the surface evaporation at the prevailing surface temperature and vacuum.

An optical sensor 426 measures the surface temperature of the fruit pieces in each zone. The sensor then transmits a signal to the control unit 428, which adjusts the energy input into that zone. A plurality of optical sensors may be provided along the path of conveyor 414 to provide various surface temperature zones within the dryer 410.

The infrared heaters 468 are energized to establish a radiantly heated surface temperature sufficient to evaporate the water at a temperature within the plastic range of the fruit, but below the point at which surface browning or spotting occurs. The plastic range is the point at which the fruit pieces are in a plastic condition, the cell walls of the fruit pieces having lost their rigidity without rupturing. Generally, this temperature will be in the range of about 95° F. to about 203° F., depending upon the degree of vacuum applied. By means of the control unit 424, the infrared heating level is appropriately maintained. The under belt radiant heaters 470 are effective to maintain the belt temperature within the plastic range of the fruit being processed.

Since the fruit pieces are in a partially dried condition, the microwave energy is significantly reduced in chamber D. However the microwave energy is sufficient to maintain a temperature level in the interior of the fruit which allows continued drying. The infrared heating energy may be maintained at a predetermined level to produce optimum evaporation at the desired vacuum level without adversely affecting the product, and also to reduce heat loss by radiation from the product.

FURTHER EXAMPLES

A dryer as shown in FIGS. 14 and 15 was used to dehydrate strawberries. Initially, the strawberries were capped and cut into dices of approximately $\frac{1}{2}'' \times \frac{1}{2}'' \times \frac{3}{8}''$. A thousand lbs. of strawberry dices were mixed with 2,000 lbs. of 66% sucrose syrup until the brix, or dissolved solids content, of the fruit dices was 35. The cycle time for dehydrating the strawberry was 43 minutes, the infrared energy was adjusted so that the heat panels were at 500° F., 400° F., 200° F., and 150° F. in the four respective heating zones B2, C2, D2, E2, respectively. Further, microwave input was increased to 7 KW, 4.5 KW, 3 KW, and 1-2 KW in the respective heating zones. The above settings were sufficient to dehydrate the product, and yet maintain the strawberry dices at a maximum temperature of about 165° F. at any point in the process.

The strawberry product P was clumping at discharge, but was easily broken apart. The color was bright red, with a crunchy texture. The flavor of the strawberry pieces was very characteristically strawberry, without any indication of being cooked. Because of the higher input moisture content, about 65%, the production rate was about 21 lbs. per hour of strawberry dices having a final moisture content of about 2%.

Gem peaches were peeled, pitted, and diced to $\frac{1}{4}''\times\frac{1}{4}''\times\frac{1}{4}''$ dices. A thousand lbs. of dices were mixed with two thousand lbs. of 66% sucrose syrup until the peaches reached 42 brix. The peach dices were processed and introduced into the vacuum dryer in the same manner as the strawberry example. A cycle time of 43 minutes was used, with the microwave energy inputs being 5.0 KW 3.8 KW, 2.6 KW and an adjusted 1-2 KW, respectively.

The dried peach pieces exhibited a deep orange-yellow color and a crunchy texture. The flavor of the peach pieces released slowly, but was typically peach-like.

The moisture content of the initial feed of the peach pieces was 57%, and, since belt loading was controlled at 1.3 lbs. per sq. ft., the dry final product output was about 23 lbs. per hour.

Having described the invention, many modifications thereto will become apparent to those skilled in the art to which it pertains without deviation from the spirit of the invention as defined by the scope of the appended claims. These modifications might include the division of the drying chamber into more or fewer zones, the use of different ratios of infrared and microwave energy, different cycle times, etc., as determined by the type of products to be dried and the particular quality attributes desired.

Having thus defined the invention the following is claimed.

1. In combination with a vessel that encloses a chamber, a product that contains moisture and is supported in the chamber, and means for introducing microwave radiation into the chamber remote from the product to elevate the temperature of the moisture in the product so that moisture escapes from the product, the improvement residing in thermal radiator means within the chamber for directing infrared radiation toward said product to also elevate the temperature of the product so as to contribute to the escape of moisture therefrom, said thermal radiator means comprising a plurality of substantially rigid metal plates positioned remote from the location at which microwave energy is introduced into the chamber and each having an uninterrupted surface area presented toward the product, but being spaced from the product, the plates being spaced apart in the direction of the surface areas thereof to provide openings permitting substantial amounts of microwave radiation of random polarization to pass the plates and onto the product where the product is supported; and, heating means attached to the plates for transferring heat into the plates so as to elevate the temperature of the plates along the surface area thereof that is presented toward the product, whereby the plates direct thermal radiation to the product.

2. The improvement as defined in claim 1 including means for conveying said product along a given path generally parallel to the surface areas of said plates.

3. The improvement as defined in claim 1 wherein said plates include resistance heating wires extending in said plates and means for passing current through said resistance heating wires.

4. The improvement according to claim 1 wherein a generally horizontal supporting surface exists within the chamber and the product rests on the surface; and wherein the plates are located above and spaced from the horizontal surface with the surface areas thereof presented toward the supporting surface.

5. The improvement according to claim 4 wherein the supporting surface is on a belt that moves within the chamber.

6. The improvement according to claim 4 wherein the plates are interposed between the supporting surface and the location at which the microwave energy is introduced into the chamber.

7. The improvement according to claim 1 wherein the chamber is maintained under a vacuum.

8. The improvement according to claim 1 wherein the configuration of the vessel and the substance from which it is constructed causes the microwave energy to reflect off of the surfaces thereof which line the chamber.

9. The improvement according to claim 1 wherein the heating means are electrical resistance heater which are embedded in the metal plates.

10. In combination with a vessel that encloses a chamber, a product that contains moisture and is supported in the chamber, and means for introducing microwave radiation into the chamber remote from the product to elevate the temperature of the moisture in the product so that moisture escape from the product, the improvement residing in thermal radiator means within the chamber for directing infrared radiation toward said product simultaneous with said microwave radiation to elevate the temperature of the product so as to contribute to the escape of moisture therefrom, said thermal radiator means comprising a plurality of separate heating plates between said product and said means for introducing microwave radiation into said chamber, each said plate having an uninterrupted surface facing the product, and said plates being spaced apart in the direction of said surface.

11. The improvement as defined in claim 10, wherein said heating plates include resistance heating wires extending in said plates and means for passing current through said resistance heating wires.

12. The improvement according to claim 10, wherein a generally horizontal supporting surface exists within the chamber and the product rests on the surface; and wherein the thermal radiating means is located above and spaced from the horizontal surface.

13. The improvement according to claim 12, wherein the supporting surface is on a belt that moves within the chamber.

* * * * *